(12) United States Patent
Louca et al.

(10) Patent No.: US 11,834,017 B2
(45) Date of Patent: Dec. 5, 2023

(54) DEVICE AND METHOD FOR REALIZING CONTROLLED REACTIONS IN THE EVENT OF A SYSTEM MALFUNCTION

(71) Applicant: KNORR-BREMSE SYSTEME FÜR SCHIENENFAHRZEUGE GMBH, Munich (DE)

(72) Inventors: Sebastian Louca, Munich (DE); Oliver Riediger, Munich (DE); Nigel Anstey, Bath (GB); Maximilian Schmidt, Munich (DE)

(73) Assignee: KNORR-BREMSE SYSTEME FÜR SCHIENENFAHRZEUGE GMBH

( * ) Notice: Subject to any disclaimer, the term of this patent is extended or adjusted under 35 U.S.C. 154(b) by 770 days.

(21) Appl. No.: 16/961,753

(22) PCT Filed: Jan. 8, 2019

(86) PCT No.: PCT/EP2019/137892
§ 371 (c)(1),
(2) Date: Jul. 13, 2020

(87) PCT Pub. No.: WO2019/137892
PCT Pub. Date: Jul. 18, 2019

(65) Prior Publication Data
US 2023/0219549 A1    Jul. 13, 2023

(30) Foreign Application Priority Data
Jan. 12, 2018  (DE) ..................... 10 2018 200 487.0

(51) Int. Cl.
*B60T 13/68*      (2006.01)
*B60T 17/22*      (2006.01)

(52) U.S. Cl.
CPC ............ *B60T 13/683* (2013.01); *B60T 17/22* (2013.01)

(58) Field of Classification Search
CPC ....... B60T 13/662; B60T 17/22; B60T 13/683
See application file for complete search history.

(56) References Cited

FOREIGN PATENT DOCUMENTS

| AT | 370368 B | 3/1983 |
|---|---|---|
| CN | 2516409 Y | 10/2002 |
| CN | 103747991 A | 4/2014 |

(Continued)

OTHER PUBLICATIONS

European Patent No. EP 3623236 to Hemmings et al published Mar. 18, 2020.*

(Continued)

*Primary Examiner* — Pamela Rodriguez
(74) *Attorney, Agent, or Firm* — Barnes & Thornburg LLP (57) ABSTRACT

A control device and a method controlling an emergency braking pressure of a vehicle, and a vehicle having a control device of this kind, wherein a pilot control pressure (VSDI) is modulated with a pressure modulator as a function of a load condition of the vehicle, a deceleration, a speed and/or a coefficient of friction, and a safety pilot control pressure (SVSD) is controlled with an adjusting device, and wherein in normal operation, a supply pressure is controlled only by the VSDI while, in the event of a system malfunction, the supply pressure is controlled only by the SVSD, wherein it is ensured that the emergency braking pressure does not exceed a nominal pressure in the event of the system malfunction.

17 Claims, 6 Drawing Sheets

(56) References Cited

FOREIGN PATENT DOCUMENTS

| | | |
|---|---|---|
| CN | 104955688 A | 9/2015 |
| CN | 105383471 A | 3/2016 |
| DE | 2643805 A1 | 4/1977 |
| DE | 2634319 A1 | 2/1978 |
| DE | 102008012700 B3 | 6/2009 |
| DE | 102009051019 A1 | 5/2011 |
| DE | 1066225 B | 10/2019 |
| EP | 2098424 A2 | 9/2009 |
| EP | 2493739 A1 | 9/2012 |
| FR | 2134462 A1 | 12/1972 |

OTHER PUBLICATIONS

International Search Report corresponding to PCT/EP2019/0502598, dated Mar. 21, 2019.

* cited by examiner

DEVICE AND METHOD FOR REALIZING CONTROLLED REACTIONS IN THE EVENT OF A SYSTEM MALFUNCTION

CROSS-REFERENCE AND PRIORITY CLAIM

This patent application is a U.S. National Phase of International Patent Application No. PCT/EP2019/137892 filed Jan. 8, 2019, which claims priority to German Patent Application No. 10 2018 200 487.0, the disclosure of which being incorporated herein by reference in their entireties.

FIELD

Disclosed embodiments relate to a control device and a method for controlling an emergency brake pressure of a vehicle, and a vehicle having such a control device.

BACKGROUND

In contemporary systems, in case of emergency braking, a fixed emergency brake pressure at the level of a nominal pressure, which is adapted to a load condition of the vehicle, is conducted into the brake cylinder. Due to the different friction behavior between the brake lining and the brake disk (of the braking wheel), this results in different decelerations (or braking decelerations) in dependence on the velocity, distributed on the velocity.

SUMMARY

Disclosed embodiments provide a control device and a method, using which the emergency brake pressure can be controlled in dependence on a load condition of a vehicle, a deceleration, a velocity, and/or a coefficient of friction, while a potentially hazardous high pressure level of the emergency brake pressure is prevented after loss of the electric voltage, and the emergency brake pressure is brought to a safe nominal pressure level in this case.

BRIEF DESCRIPTION OF FIGURES

Disclosed embodiments are explained in greater detail hereinafter on the basis of three exemplary embodiments with reference to the figures.

In the figures.

DETAILED DESCRIPTION

Figure 1:
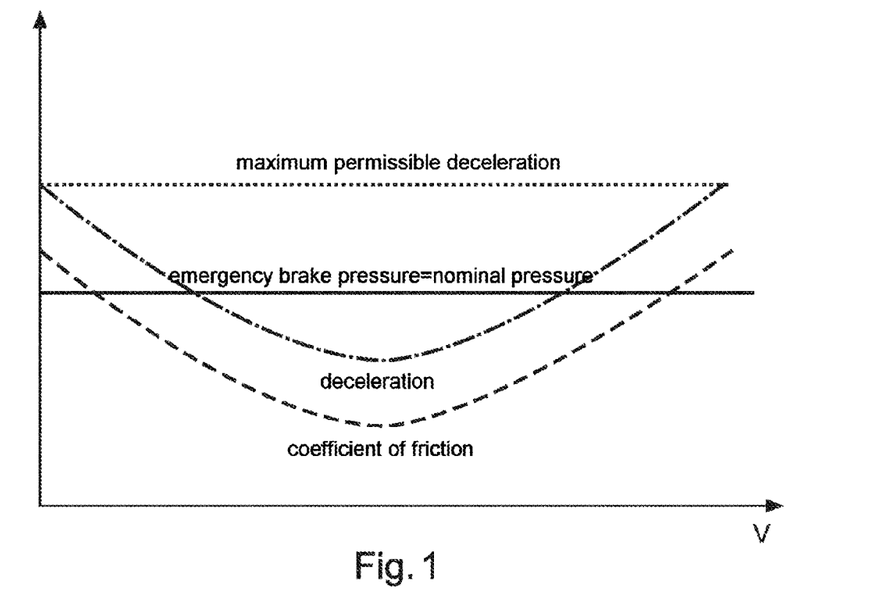
FIG. 1 shows a profile of the deceleration during a braking procedure in dependence on the velocity and the coefficient of friction if the emergency brake pressure is constant at the level of a nominal pressure.

As mentioned above, in contemporary systems, in case of emergency braking, a fixed emergency brake pressure at the level of a nominal pressure, which is adapted to a load condition of the vehicle, is conducted into the brake cylinder. Due to the different friction behavior between the brake lining and the brake disk (of the braking wheel), this results in different decelerations (or braking decelerations) in dependence on the velocity, distributed on the velocity. As shown in FIG. 1, if the emergency brake pressure is constant, wherein the coefficient of friction has a U-shaped curve profile: in the low velocity range, the coefficient of friction decreases when the velocity increases, and in the high velocity range, the coefficient of friction increases when the velocity increases. The deceleration is dependent on the emergency brake pressure and the coefficient of friction and in this case it has a similar behavior as the coefficient of friction in relation to the velocity.

Figure 2:
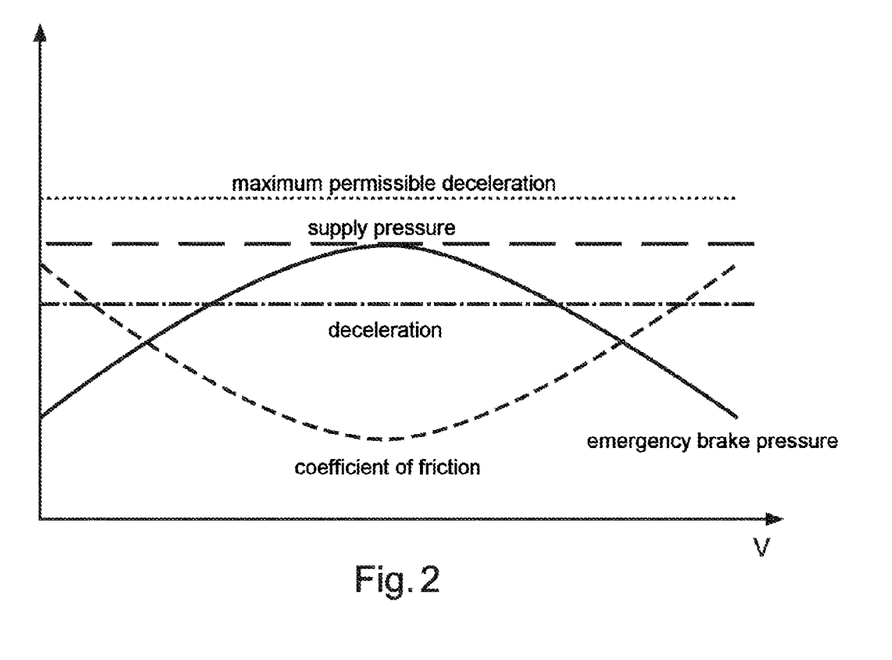
FIG. 2 shows a constant deceleration during a braking procedure in dependence on the velocity and the coefficient of friction if the emergency brake pressure is controlled accordingly.

The deceleration is to be kept as constant as possible, for example, for the driving comfort and safety. One solution for this is to use a suitable regulator in the system, in order to control the emergency brake pressure not only in dependence on the load condition of the vehicle but rather also on the deceleration, the velocity, and/or the coefficient of friction. As shown in FIG. 2, the emergency brake pressure is controlled so that it is less in the low velocity range and the high velocity range than in the moderate velocity range and extends in an inverted U shape, whereby the deceleration is constant. In order that the deceleration remains constant at a suitable level (normally greater than the lowest deceleration of FIG. 1), it is necessary for a supply pressure for generating the emergency brake pressure in FIG. 2 to be greater than the constant emergency brake pressure from FIG. 1.

Figure 3:
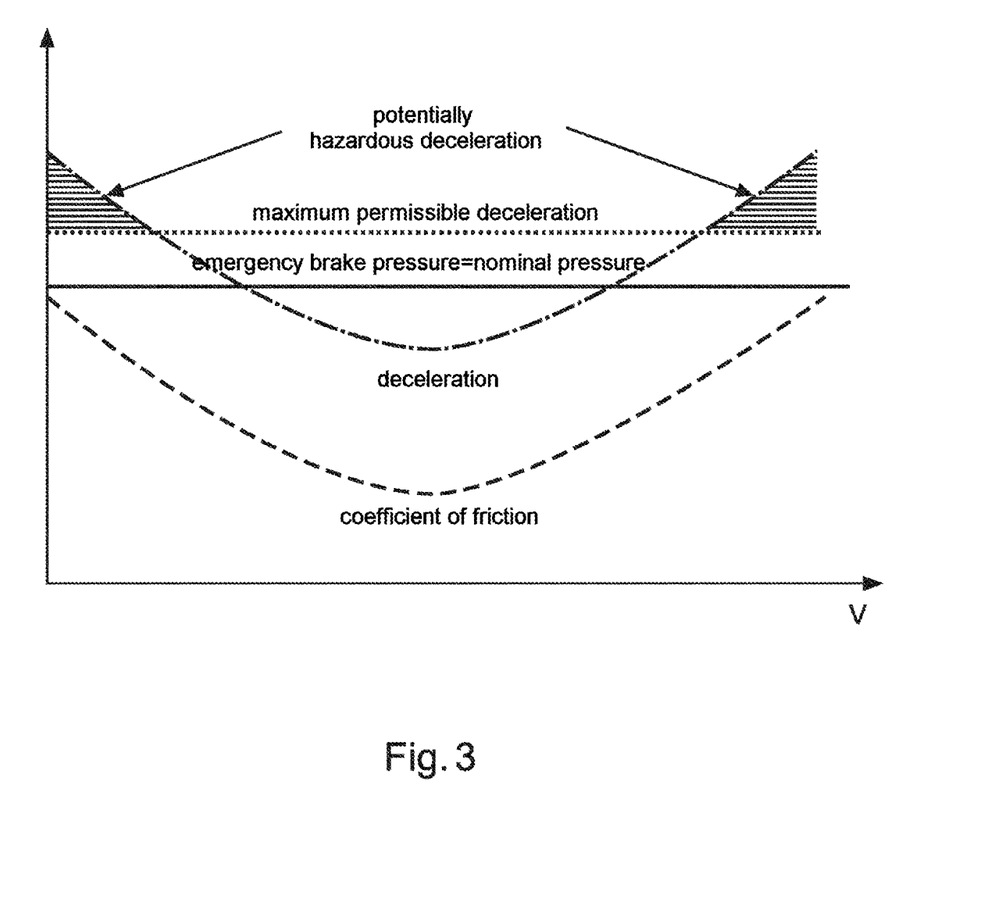
FIG. 3 shows a profile of the deceleration during a braking procedure in dependence on the velocity and the coefficient of friction if the emergency brake pressure is constant at the level of a supply pressure.

Such systems having the above-described solution are "low active" in most cases, i.e., a drop of an electric voltage lets through the supply pressure in an unregulated manner to the brake cylinders, as shown in FIG. 3. In this case, the emergency brake pressure is exactly equal to the supply pressure, the deceleration thus has a U-shaped profile. Since the supply pressure is greater than the constant emergency brake pressure from FIG. 1, as described above, the deceleration in the event of system malfunction, for example, in the event of a power failure, will be excessively large in the lowest velocity range and the highest velocity range. It therefore exceeds the maximum permissible deceleration.

The disclosed embodiments, therefore, are based on the object of providing a control device and a method, using which the emergency brake pressure can be controlled in dependence on a load condition of a vehicle, a deceleration, a velocity, and/or a coefficient of friction, while a potentially hazardous high pressure level of the emergency brake pressure is prevented after loss of the electric voltage, and the emergency brake pressure is brought to a safe nominal pressure level in this case.

According to the disclosed embodiments, a control device controls an emergency brake pressure of a vehicle. The control device includes a pressure regulator, which is configured to regulate a pilot pressure VSD1 for regular operation, wherein the VSD1 is determined beforehand in dependence on a load condition of the vehicle, a deceleration, a velocity, and/or a coefficient of friction, a setting unit, which is configured to control a safety pilot pressure SVSD in the event of system malfunction (for example, in the event of power failure or in the event of specific diagnostic cases, for example, malfunction of the pressure regulator), and a pressure converter (for example, a relay valve), which comprises a pressure inlet for a pneumatic or hydraulic pressure supply, at least one pressure inlet for at least one pilot pressure, and a pressure outlet for an emergency brake pressure, wherein the pressure converter is configured to control a supply pressure of the pressure supply from the pilot pressure VSD1 or SVSD and then to output it as the emergency brake pressure. Furthermore, the control device is configured such that in regular operation, only the VSD1 is applied to the pressure converter to control the supply pressure, and in the event of system malfunction, only the SVSD is supplied to the pressure converter to control the supply pressure, wherein it is ensured that the emergency brake pressure remains below a nominal pressure in the event of system malfunction.

For example, a solenoid valve is arranged before the pressure converter and after the pressure regulator and is configured to let through the VSD1 in regular operation and not to let it through in the event of system malfunction.

Furthermore, for example, a second solenoid valve is arranged before the pressure converter and is configured to block the SVSD in regular operation and to let it through to the pressure converter in the event of system malfunction.

In an exemplary embodiment, the pressure regulator comprises two solenoid valves, wherein one of them is used as an aerator and the other of them is used as a deaerator. The pressure regulator can advantageously also comprise a pressure sensor.

A pressure reducing valve can advantageously be arranged before the pressure regulator in order to regulate a maximum permissible pilot pressure and to output it further to the pressure regulator, so that the pressure regulator does not have to regulate a supplied pressure down from an excessively high pressure level in order to save energy.

In an exemplary embodiment, the setting unit of the SVSD comprises a pressure reducing valve, to ensure that the SVSD is kept above a minimum pilot pressure independently of the system malfunction.

In an exemplary embodiment, the setting unit of the SVSD can further comprise a pressure regulator to control the SVSD.

Furthermore, the pressure converter can comprise either two inlet fittings for pilot pressures or only one inlet fitting for one pilot pressure, wherein in the case of only one inlet fitting, a switchover device (for example, a double check valve) is provided, so that only one pilot pressure is let through further to the pressure converter.

The pressure converter can comprise a piston and at least one pressure plate, to control the supply pressure by way of pressure compensation and piston movement.

Figure 4:
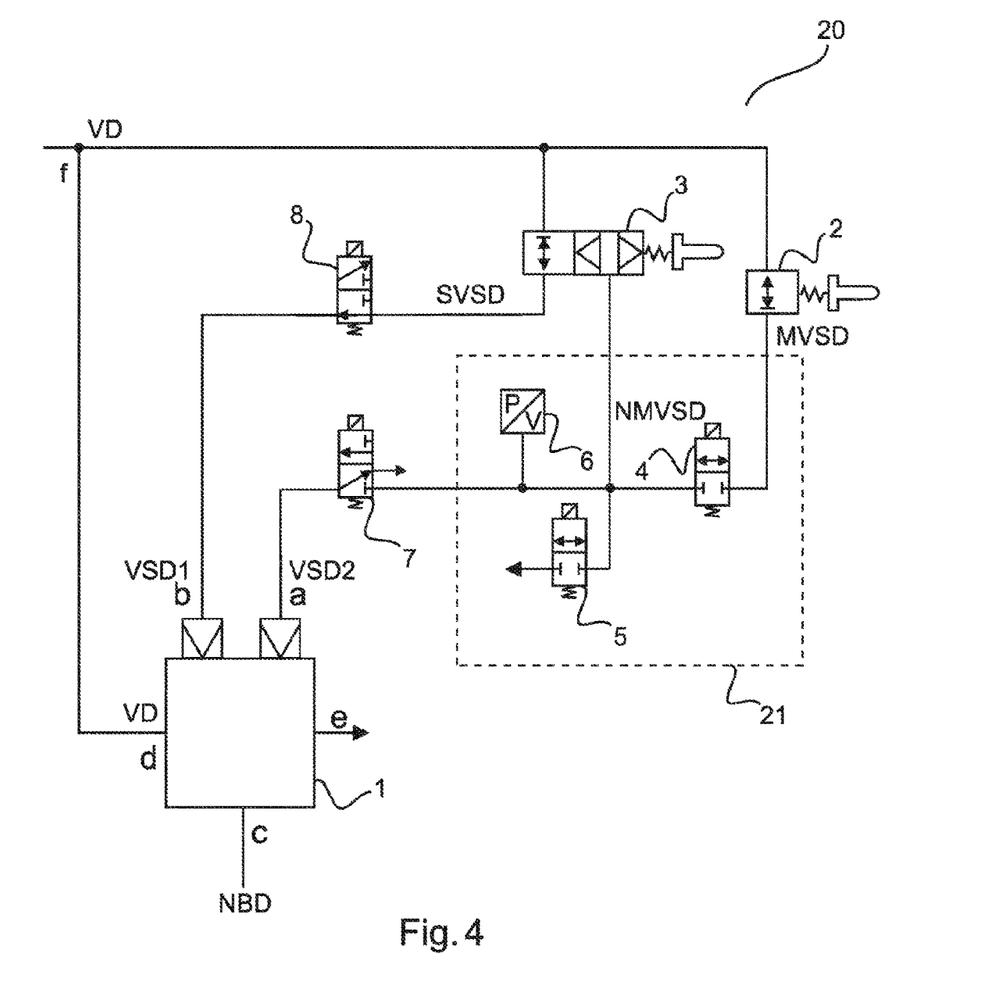
FIG. 4 shows a schematic illustration of a control device according to a first exemplary embodiment.

FIG. 4 shows a control device 20 according to a first exemplary embodiment in a system malfunction state. A relay valve 1 and two pressure reducing valves 2 and 3 are provided, wherein compressed air is guided as a pressure supply via a compressed air fitting f via an inlet fitting d to the relay valve 1 and to the pressure reducing valves 2 and 3.

Figure 5:
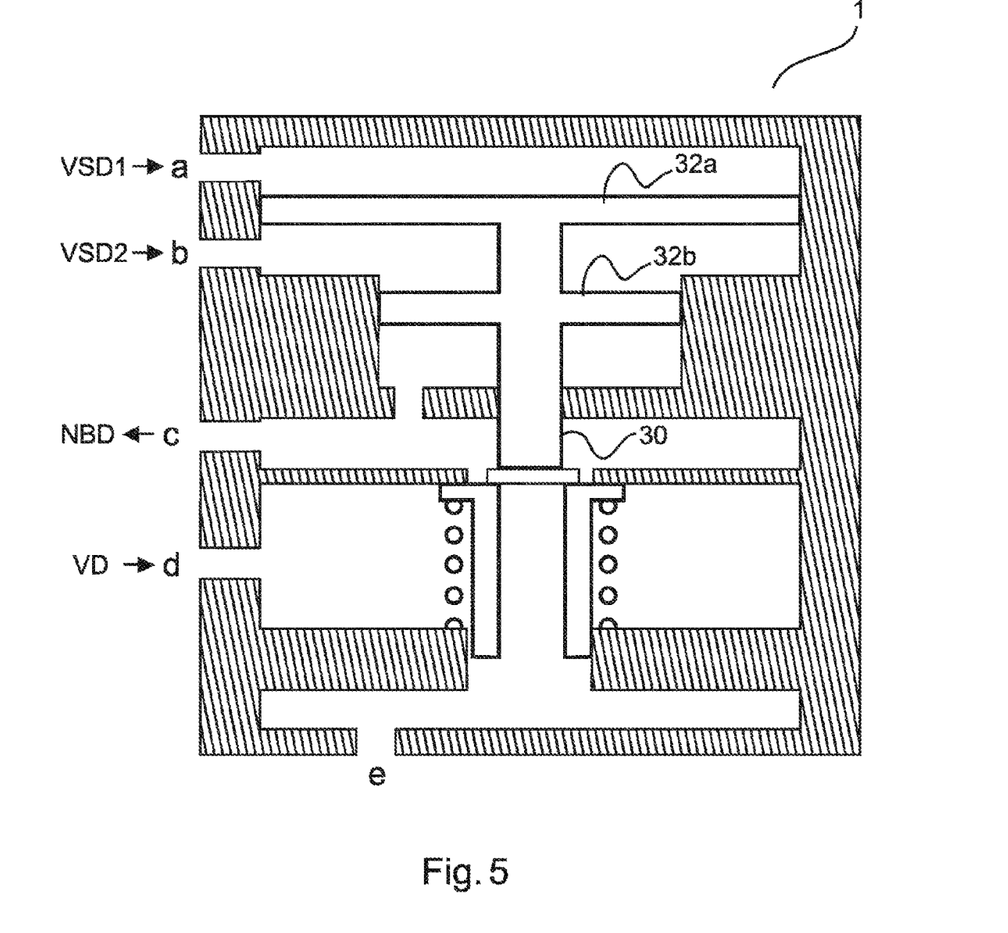
FIG. 5 shows a schematic illustration of the relay valve of FIG. 4.

FIG. 5 shows a detailed view of the relay valve 1. In addition to the above-mentioned inlet fitting d, the relay valve also comprises two inlet fittings a and b, and two outlet fittings c and e. Pilot pressures VSD1 and VSD2 are respectively introduced into the relay valve via the inlet fittings a and b. The pilot pressure VSD1 acts on a pressure plate 32a and the pilot pressure VSD2 acts on a pressure plate 32b, which are both axially arranged on a piston 30, whereby the piston 30 is moved to control a supply pressure (VD) of the pressure supply and then to output it as an emergency brake pressure (NBD) via the outlet fitting c. The outlet fitting e is provided to vent excess compressed air to the surroundings. The diameter of the pressure plate 32a is larger than the diameter of the pressure plate 32b. The pressure conversion ratios of the two pressure plates are accordingly different. The lower end of the piston 30 terminates at a piston element to be sealed, which is pressed by a spring against a chamber opening and seals it. This chamber is filled by the supply pressure VD. Depending on the piston movement of the piston 30, controlled by VSD1 or VSD2, the opening to the outlet c is opened so that the emergency brake pressure NBD is conducted through the outlet c.

According to the control by means of the relay valve 1, a conversion ratio y results between the VSD1 and the NBD and a conversion ratio x results between the VSD2 and the NBD. It is provided that the VSD1 controls the VD such that the NBD is greater than the VSD1, i.e.

$$y = NBD/VSD1 > 1.$$

And it is provided that the VSD2 controls the VD such that the NBD is less than the VSD2, i.e.

$$x = NBD/VSD2 < 1.$$

The conversion ratios x and y can be set as desired by adapting the size of pressure plates 32a and 32b.

Furthermore, the pressure reducing valve 2 in FIG. 4 is configured to reduce the VD of the compressed air supply to a maximum permissible pilot pressure (MVSD) and to conduct the MSVD further to a pressure regulator 21. One advantage here is that the pressure regulator 21 does not have to regulate down a supplied pressure from an excessively high pressure level to save energy.

The pressure regulator 21 comprises two solenoid valves 4 and 5 and a pressure sensor 6, wherein the solenoid valves 4 and 5 are configured to regulate the supplied pressure to a predetermined level and the pressure sensor 6 is configured to measure a regulated pressure and possibly to generate a signal so that the solenoid valves 4 and 5 can correct a possible deviation.

In this embodiment, it is provided that the pressure regulator 21 regulates the MVSD from the pressure reducing valve 2 to a nominal pilot pressure (NMVSD), wherein the NMVSD is calculated in dependence on a load condition of the vehicle, a deceleration, a velocity, and/or a coefficient of friction by means of a predetermined processing unit and output to the pressure regulator 21.

A solenoid valve 7 is arranged after the pressure regulator 21, wherein it is configured such that it remains active in regular operation and lets through the NMVSD from the pressure regulator 21 to the inlet fitting a of the relay valve 1 (VSD1=NMVSD). The relay valve 1 then converts this VSD1 using the conversion ratio y into a higher pressure, i.e.

$$NBD(\text{in regular operation}) = VSD1 * y.$$

The pressure reducing valve 3 is provided to control the VD using the NMVSD from the pressure regulator 21 and to let it through further to a solenoid valve 8, wherein the pressure reducing valve 3 is configured such that it firstly reduces the VD to a minimal pilot pressure (mechanically and independently of an electric voltage) and then controls (increases) the minimal pilot pressure using the NMVSD from the pressure regulator 21, whereby a safety pilot pressure (SVSD) results. In regular operation, it is set such that SVSD=NMVSD.

The solenoid valve 8 is arranged after the pressure reducing valve 3, wherein it is configured such that it remains active in regular operation and blocks the passing on of the SVSD from the pressure reducing valve 3 to the relay valve 1.

In case of a power loss, the solenoid valve 7 sinks and lets the NMVSD vent from the pressure regulator 21, and simultaneously the solenoid valve 8 also drops and lets the SVSD through to the inlet fitting b of the relay valve 1 (VSD2=SVSD). Due to the venting, the VSD1 gradually decreases, and therefore the VSD2 decreases from a level of NMVSD down to the level of the minimal pilot pressure.

In this way, the constitution of the solenoid valves 7 and 8 permits the VD to only be controlled by the VSD2 in the event of system malfunction and an NBD (in the event of system malfunction) is thus secured, wherein $$NBD(\text{in the event of system malfunction})=VSD2*x,$$

as described above. At the beginning of the occurrence of the system malfunction, VSD2=NMVSD, and the conversion ratio x is set such that $$NBD(\text{in the event of system malfunction})\\=NMVSD*x=\text{nominal pressure, thus } x=\text{nominal pressure}/NMVSD.$$

The VSD2 then sinks in the direction of the minimal pilot pressure, therefore the NBD (in the event of system malfunction) also sinks gradually from the nominal pressure down to a lower limit. Accordingly, in case of a system malfunction, an NBD, which does not exceed the nominal pressure and does not fall below the lower limit, is provided.

Figure 6:
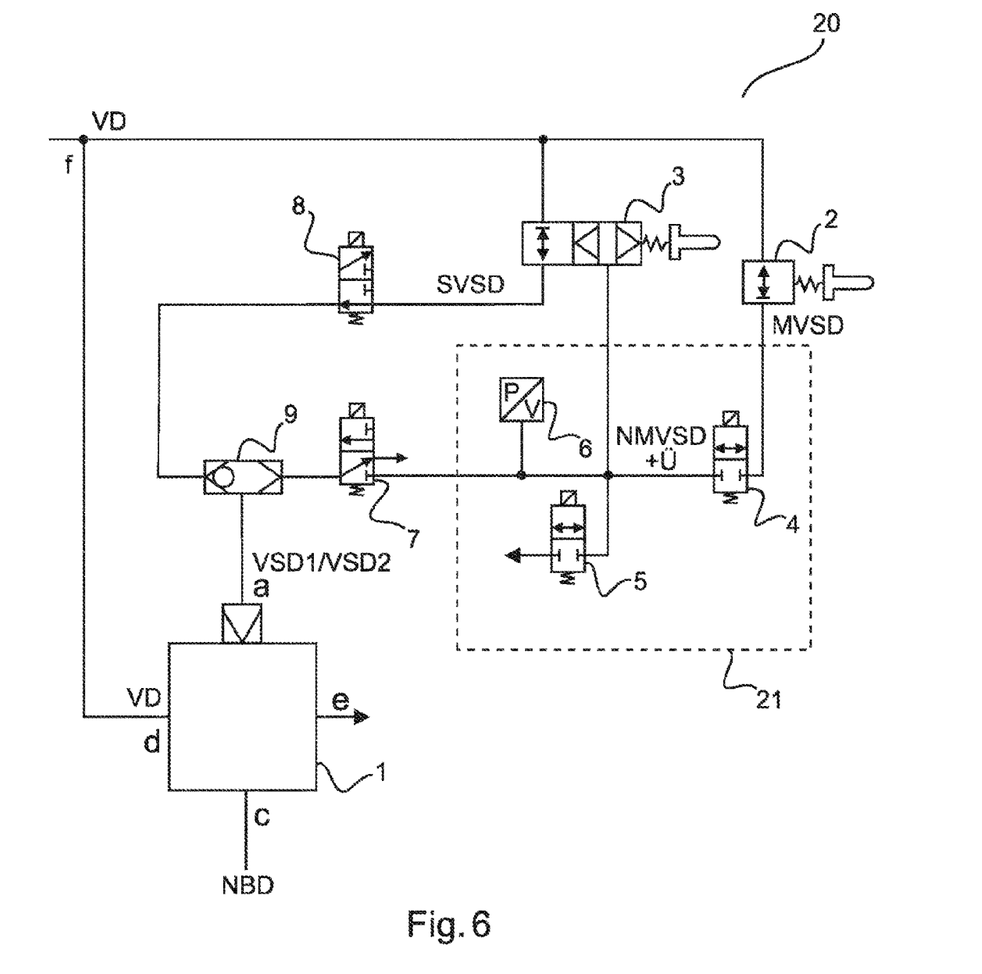
FIG. 6 shows a schematic illustration of a control device according to a second exemplary embodiment.

FIG. 6 shows a control device 20 according to a second exemplary embodiment in a system malfunction state. A relay valve 1 is provided similarly as in FIG. 4, wherein the inlet fitting b was omitted and only the inlet fitting a is provided. As in FIG. 4, two pressure reducing valves 2 and 3, a pressure regulator 21 including two solenoid valves 4 and 5 and a pressure sensor 6, and two solenoid valves 7 and 8 are provided. In addition to the embodiment in FIG. 4, the embodiment of FIG. 6 has a double check valve 9 before the relay valve 1, to carry out a pressure comparison between the pilot pressures after the solenoid valves 7 and 8, to only let through the greater pilot pressure further to the inlet fitting a of the relay valve 1.

The components in FIG. 6 having the same reference signs as in FIG. 4 are configured just as in FIG. 4. The difference is that the pilot pressure VSD1, regulated by the pressure regulator 21, is brought to a level of a nominal pilot pressure having a superelevation Ü, i.e.

$$VSD1=NMVSD+\ddot{U},$$

wherein the pressure reducing valve 3 still controls the VD as in FIG. 4 the VSD1 from the pressure regulator 21 and outputs an SVSD. At the beginning, the SVSD is kept at a level of NMVSD (SVSD=NMVSD).

As in FIG. 4, the constitution in FIG. 6 is also designed such that the VD is only controlled by the VSD1 in regular operation and is only controlled by the VSD2 by means of the relay valve 1 in the event of system malfunction. In both cases, only the conversion ratio x is provided. I.e.

$$NBD(\text{in the event of system malfunction})=VSD2*x.$$

Since at the beginning of the occurrence of the system malfunction VSD2=NMVSD, in this case also as in FIG. 4, $$NBD(\text{in the event of system malfunction})\\=NMVSD*x=\text{nominal pressure}.$$

In regular operation, then $$NBD(\text{in regular operation})=VSD1*x=(NMVSD+\ddot{U})*x,$$

Since the conversion ratio x is set fixedly to the value of nominal pressure/NMVSD, the superelevation Ü thus also has to be determined accordingly so that the NBD (in regular operation) has a suitable amount.

Figure 7:
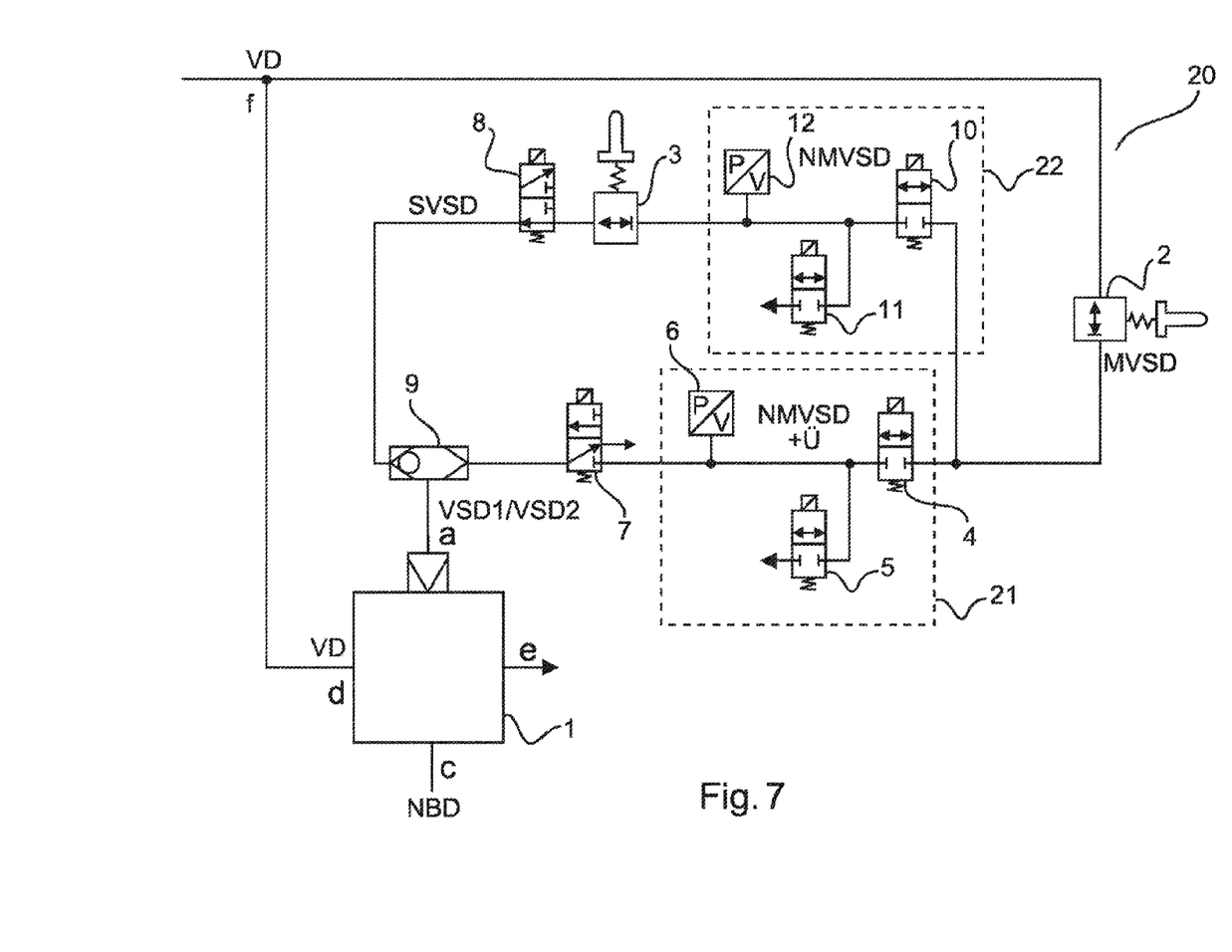
FIG. 7 shows a schematic illustration of a control device according to a third exemplary embodiment.

FIG. 7 shows a control device 20 according to a third exemplary embodiment, wherein the control device 20 functions identically in principle as the control device 20 of FIG. 6. In comparison to the exemplary embodiment of FIG. 6, the control device 20 of FIG. 7 additionally has a pressure regulator 22 including two solenoid valve 10 and 11 and a pressure sensor 12, similarly to the pressure regulator 21, to control an SVSD independently of the VSD2 from the pressure regulator 21. As in FIG. 6, the SVSD is also kept at NMVSD at the beginning. In regular operation, the pressure regulator 21 regulates a VSD1 (VSD1=NMVSD+Ü), as described above, and similarly $$NBD(\text{in regular operation})=VSD1*x=(NMVSD+\ddot{U})*x,$$

and in the event of system malfunction $$NBD(\text{in the event of system malfunction})=VSD2*x.$$

The above exemplary embodiments enable a suitable NBD to be obtained in regular operation on the basis of a previously determined NMVSD, so that the NBD is controlled in dependence on a load condition of the vehicle, a deceleration, a velocity, and/or a coefficient of friction and thus the deceleration remains as constant as possible, and in the event of system malfunction, an NBD between a nominal pressure and a lower limit is provided.

LIST OF REFERENCE SIGNS

1 pressure converter
2, 3, 7, 8 pressure reducing valve
4, 5 solenoid valve
6 pressure sensor
9 switchover devices/double check valve
20 control device
21, 22 pressure regulator
30 piston
32a, 32b pressure plate

The invention claimed is:
1. A control device for controlling an emergency brake pressure of a vehicle, the control device comprising:
 a pressure regulator configured to regulate a pilot pressure (VSD1) for regular operation, wherein the VSD1 is determined beforehand in dependence on a load condition of the vehicle, a deceleration, a velocity, and/or a coefficient of friction;
 a setting unit configured to control a safety pilot pressure (SVSD) in the event of system malfunction,
 a pressure converter that includes:
  a pressure inlet for a pneumatic or hydraulic pressure supply,
  at least one pressure inlet for at least one pilot pressure, and
  a pressure outlet for an emergency brake pressure,
 wherein the pressure converter is configured to control a supply pressure of the pressure supply from the pilot pressure (VSD1) or the safety pilot pressure (SVSD) and then to output the supply pressure as the emergency brake pressure,
 wherein the control device is configured such that, in regular operation, only the VSD1 is supplied to the pressure converter to control the supply pressure, and, in the event of system malfunction, only the SVSD is supplied to the pressure converter to control the supply pressure, and wherein it is ensured that the emergency brake pressure remains below a nominal pressure in the event of system malfunction.

2. The control device of claim 1, further comprising a solenoid valve, which is arranged before the pressure converter and after the pressure regulator and is configured to let through the VSD1 in regular operation and not to let the VSD1 through in the event of system malfunction.

3. The control device as claimed in claim 1, further comprising a solenoid valve, which is arranged before the pressure converter and is configured to block the SVSD in regular operation and to let the SVSD through to the pressure converter in the event of system malfunction.

4. The control device of claim 1, wherein the pressure regulator comprises two solenoid valves, wherein one of the two solenoid valves is used as an aerator and the other of is used as a deaerator.

5. The control device of claim 1, wherein the pressure regulator comprises a pressure sensor.

6. The control device of claim 1, furthermore comprising a pressure reducing valve, which is arranged before the pressure regulator to regulate a maximum permissible pilot pressure and output the maximum permissible pilot pressure to the pressure regulator.

7. The control device of claim 1, wherein the setting unit of the SVSD comprises a pressure reducing valve, which is configured to ensure that the SVSD is kept above a minimal pilot pressure independently of the system malfunction.

8. The control device of claim 1, wherein the setting unit of the SVSD further comprises a pressure regulator, which is configured to control the SVSD.

9. The control device of claim 1, wherein the pressure converter comprises two inlet fittings for pilot pressures.

10. The control device of claim 1, wherein the pressure converter is one inlet fitting for a pilot pressure, and wherein a switchover device is provided before the pressure converter so that only one of the pilot pressures is let through the pressure converter.

11. The control device of claim 10, wherein the switchover device is a double check valve.

12. The control device of claim 1, wherein the pressure converter is a relay valve.

13. The control device of claim 1, wherein the pressure converter comprises a piston and at least one pressure plate.

14. A vehicle having at least one control device of claim 1.

15. A method for controlling an emergency brake pressure of a vehicle, wherein an emergency brake pressure is controlled and provided by a pneumatic or hydraulic pressure supply by a pressure converter, the method comprising:
setting a pilot pressure (VSD1) using a pressure regulator, wherein the VSD1 is predetermined in dependence on a load condition of the vehicle, a deceleration, a velocity, and/or a coefficient of friction;
setting a safety pilot pressure (SVSD) using a setting unit, in regular operation, letting through the VSD1 and blocking the SVSD and controlling the pressure supply only using the VSD1;
in the event of system malfunction, not letting through the VSD1 and letting through the SVSD and controlling the pressure supply only using the SVSD,
wherein the emergency brake pressure is secured such that the emergency brake pressure does not exceed a nominal pressure in the event of system malfunction.

16. The method for controlling an emergency brake pressure of a vehicle of claim 15, wherein the VSD1 and the SVSD are both set at the beginning to the level of a nominal pilot pressure, the VSD1 in regular operation controls the supply pressure by means of the pressure converter such that the emergency brake pressure is greater than the VSD1, and the SVSD in the event of system malfunction controls the supply pressure by the pressure converter such that the emergency brake pressure is less than the SVSD.

17. The method for controlling an emergency brake pressure of a vehicle of claim 15, wherein the VSD1 is set at the beginning to the level of a nominal pilot pressure with a superelevation and the SVSD is set at the beginning to the level of a nominal pilot pressure without the superelevation, and the VSD1 in regular operation and the SVSD in the event of system malfunction control the supply pressure by the pressure converter in an identical manner such that the emergency brake pressure in both cases is less than the VSD1 or the SVSD.

* * * * *